US012659617B2

(12) United States Patent
　　Yokoyama

(10) Patent No.:　US 12,659,617 B2
(45) Date of Patent:　　Jun. 16, 2026

(54) PHOTOELECTRIC CONVERSION DEVICE, MOVABLE APPARATUS, PHOTOELECTRIC CONVERSION METHOD, AND STORAGE MEDIUM

(71) Applicant: CANON KABUSHIKI KAISHA, Tokyo (JP)

(72) Inventor: Junya Yokoyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 18/748,180

(22) Filed: Jun. 20, 2024

(65) Prior Publication Data

US 2024/0430589 A1　　Dec. 26, 2024

(30) Foreign Application Priority Data

Jun. 23, 2023　　(JP) ................................. 2023-103647

(51) Int. Cl.
　　*H04N 25/703*　　(2023.01)
　　*H04N 23/80*　　(2023.01)
(52) U.S. Cl.
　　CPC ........... *H04N 25/703* (2023.01); *H04N 23/80* (2023.01)
(58) Field of Classification Search
　　CPC ...... H04N 25/703; H04N 23/80; H04N 23/71; H04N 23/73; H04N 25/53; H04N 25/773
　　See application file for complete search history.

(56) References Cited

U.S. PATENT DOCUMENTS

2009/0147120 A1 *　6/2009　Kurane .................. H04N 23/72
　　　　　　　　　　　　　　　　　　348/311
2019/0191120 A1　　6/2019　Ikedo
　　　　　　　　　　(Continued)

FOREIGN PATENT DOCUMENTS

EP　　　　3499873 A2 *　6/2019　................ G01J 1/44
JP　　　　7223070 B2　　2/2023

OTHER PUBLICATIONS

Extended European Search Report issued by the European Patent Office on Sep. 19, 2024 in corresponding EP Patent Application No. 24183615.4.

*Primary Examiner* — Mekonnen D Dagnew
(74) *Attorney, Agent, or Firm* — Carter, DeLuca & Farrell LLP

(57)　　　　　　　ABSTRACT

A photoelectric conversion device comprising: a plurality of pixels each of which is configured to include a sensor unit configured to generate pulses corresponding to photons, a counter configured to count the number of the pulses, and a memory configured to stores a count value of the counter; and a control unit configured to generate signals based on count values of the counter counted within an accumulation period, perform an accumulation operation of a first accumulation period and a second accumulation period within a full frame period, wherein the first accumulation period is shorter than the second accumulation period, output a signal generated in the first accumulation period between an end of the first accumulation period and an end of the second accumulation period, and control the number of times of accumulation periods within the full frame period or a length of the accumulation period of another accumulation operation within another full frame period based on a result of evaluating signals generated in the first accumulation period.

15 Claims, 15 Drawing Sheets

(56)     References Cited

U.S. PATENT DOCUMENTS

2020/0260033 A1*   8/2020  Yeo ...................... H04N 25/766
2024/0406574 A1    12/2024  Saito
2024/0406598 A1    12/2024  Saito

* cited by examiner

PHOTOELECTRIC CONVERSION DEVICE, MOVABLE APPARATUS, PHOTOELECTRIC CONVERSION METHOD, AND STORAGE MEDIUM

BACKGROUND OF THE INVENTION

Field of the Invention

The present invention relates to a photoelectric conversion device, a movable apparatus, a photoelectric conversion method, a storage medium, and the like.

Description of the Related Art

In recent years, a photoelectric conversion device that digitally counts the number of photons incident to an avalanche photodiode (APD) and outputs the count value as photoelectrically converted digital signals from a pixel has been developed. Additionally, for example, in Japanese Patent No. 7,223,070, a configuration in which a photoelectric conversion device that has an APD can output a plurality of videos whose accumulation periods overlap each other, thereby enabling continuous shooting even at low illuminance is possible is described.

However, for example, in a case in which imaging elements of an in-vehicle camera that is installed in a movable apparatus is assumed, since recognition processing is performed on a frame-by-frame basis in normal sensor driving, for example, in the case of 30 fps, the recognition processing can be executed only for each 33.3 ms. Therefore, in the in-vehicle camera, even if an object jumps in immediately after frame switching, the recognition processing cannot be performed until the end of the frame.

Additionally, in an in-vehicle camera, an accumulation period is often set to be equal to or longer than a certain period (11 ms) so that flickering due to a traffic light is suppressed, and a bright image is captured by increasing the accumulation period, in particular, in a low illumination environment. However, since the accumulation period is long, object blurring occurs in an object moving at a high speed, and the recognition rate decreases.

Additionally, the accumulation period required for recognizing an object changes depending on the situations such as day and night. For example, in the case of a situation in which the illumination is extremely high such as daytime in summer, even if the accumulation period is short, the allowable saturation amount of the pixel is reached, the gradation of a bright portion of the image is lost, and as a result, the recognition accuracy of the object may decrease. Additionally, in the case of nighttime, a sufficient amount of light cannot be obtained, and the gradation of the image is not sufficient, so that the recognition accuracy of the object may decrease.

SUMMARY OF THE INVENTION

One aspect of the photoelectric conversion device of the present invention comprises: a plurality of pixels each of which is configured to include a sensor unit that generates pulses corresponding to photons, a counter that counts the number of the pulses, and a memory that stores a count value of the counter; and at least one processor or circuit configured to function as: a control unit configured to generate signals based on count values of the counter counted within an accumulation period, perform an accumulation operation of a first accumulation period and a second accumulation period within a full frame period, wherein the first accumulation period is shorter than the second accumulation period, output a signal generated in the first accumulation period between an end of the first accumulation period and an end of the second accumulation period, and control the number of times of accumulation periods within the full frame period or a length of the accumulation period of another accumulation operation within another full frame period based on a result of evaluating signals generated in the first accumulation period.

Further features of the present invention will become apparent from the following description of embodiments with reference to the attached drawings.

BRIEF DESCRIPTION OF THE DRAWINGS

FIG. 9 is a diagram that illustrates the relation between memory circuits and buffers in the embodiment.

FIG. 12 is a functional block diagram showing an input/output relation between a photoelectric conversion element 100, an image processing unit 603, and the camera control unit 605, and a detailed configuration example of the camera control unit 605.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
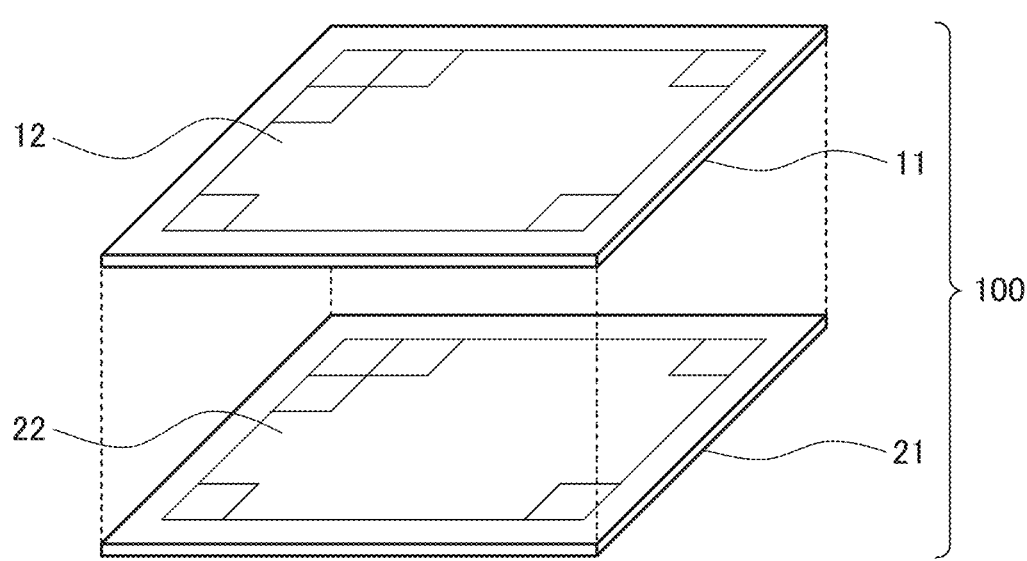
FIG. 1 is a diagram showing a configuration example of a photoelectric conversion element of the embodiment of the present invention.

FIG. 1 is a diagram showing a configuration example of a photoelectric conversion element of the embodiment of the present invention. Hereinafter, a photoelectric conversion device in which a photoelectric conversion element 100 has what is referred to as lamination structure in which two substrates of a sensor substrate 11 and a circuit substrate 21 are laminated and electrically connected will be explained as an example.

However, what is referred to as a non-stacked structure in which a configuration included in the sensor substrate and a configuration included in the circuit substrate are disposed on a shared semiconductor layer may be adopted. The sensor substrate 11 includes a pixel region 12. The circuit substrate 21 includes a circuit region 22 that processes signals that have been detected in the pixel region 12.

Figure 2:
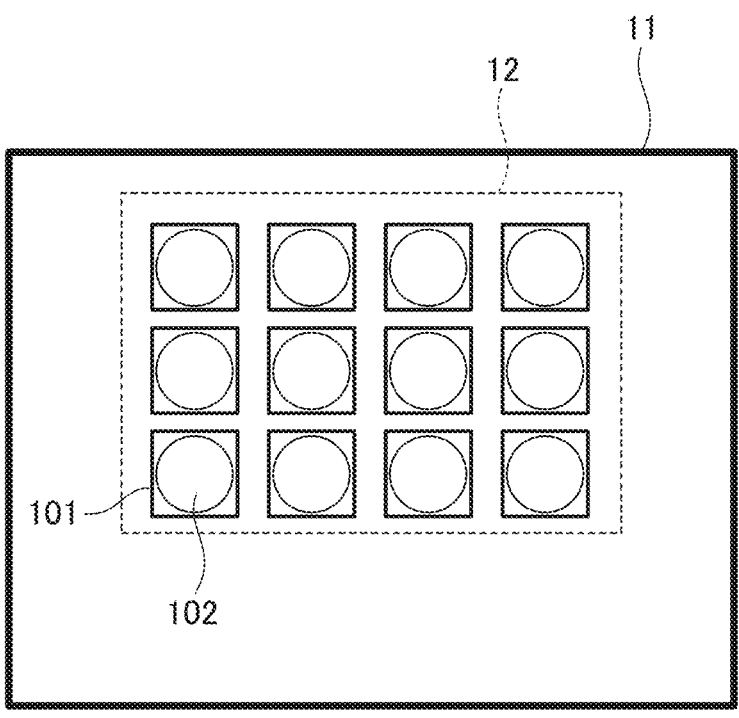
FIG. 2 is a diagram showing a configuration example of a sensor substrate 11.

FIG. 2 is a diagram illustrating a configuration example of the sensor substrate 11. The pixel region 12 of the sensor substrate 11 includes a plurality of pixels 101 arranged two-dimensionally in a plurality of rows and columns. The pixel 101 includes a photoelectric conversion unit 102 including an avalanche photodiode (hereinafter, referred to below as an "APD").

Here, the photoelectric conversion unit 102 functions as a sensor unit that generates a pulse at a frequency corresponding to the frequency of reception of photons. Note that the number of rows and the number of columns of the pixel array forming the pixel region 12 are not particularly limited.

Figure 3:
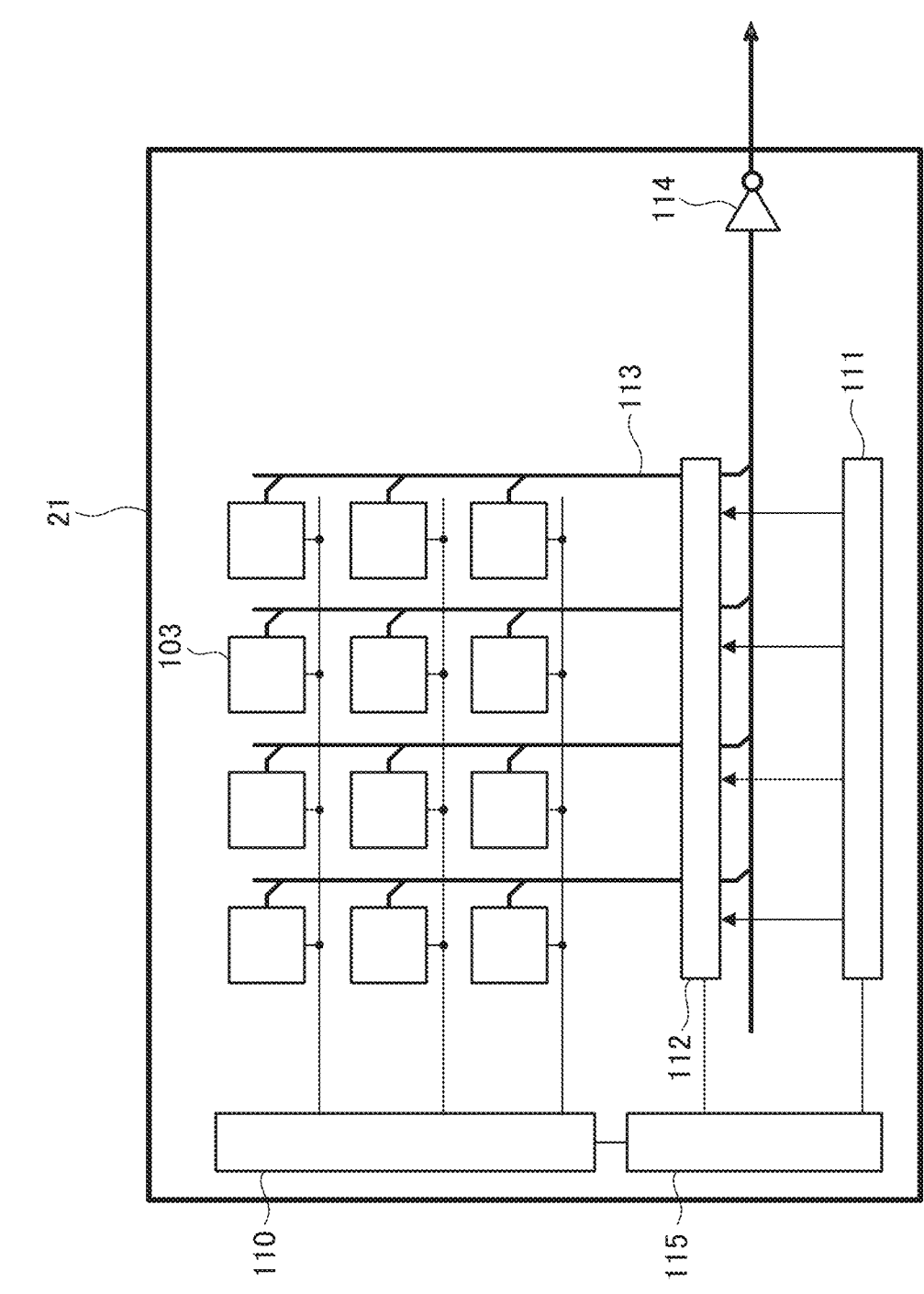
FIG. 3 is a diagram showing a configuration example of a circuit substrate 21.

FIG. 3 is a diagram showing a configuration example of the circuit substrate 21. The circuit substrate 21 has the signal processing circuit 103 that processes charges that have been photoelectrically converted by the photoelectric conversion units 102 in FIG. 2, a readout circuit 112, a control pulse generation unit 115, a horizontal scanning circuit 111, a vertical signal line 113, a vertical scanning circuit 110, and an output circuit 114.

The vertical scanning circuit 110 receives control pulses supplied from the control pulse generation unit 115, and sequentially supplies the control pulses to the plurality of pixels arranged in the row direction. A logic circuit, for example, a shift register and an address decoder, is used in the vertical scanning circuit 110.

Signals that have been output from the photoelectric conversion unit 102 of each pixel are processed by each signal processing circuit 103. The signal processing circuit 103 is provided with a counter, a memory, and the like, and a digital value is held in the memory. The horizontal scanning circuit 111 inputs control pulses that sequentially select each column to the signal processing circuit 103 in order to read out signals from the memory of each pixel in which digital signals are held.

Signals are output to the vertical signal line 113 from the signal processing circuit 103 of the pixel in the row that has been selected by the vertical scanning circuit 110. The signals output to the vertical signal line 113 are output to the outside of the photoelectric conversion element 100 via the readout circuit 112 and the output circuit 114. The readout circuit 112 incorporates a plurality of buffers that are connected to the vertical signal line 113.

As illustrated in FIG. 2 and FIG. 3, a plurality of signal processing circuits 103 are arranged in a region overlapping the pixel region 12 in a planar view. In addition, the vertical scanning circuit 110, the horizontal scanning circuit 111, the readout circuit 112, the output circuit 114, and the control pulse generation unit 115 are disposed so as to overlap between an end of the sensor substrate 11 and an end of the pixel region 12 in planar view.

That is, the sensor substrate 11 has a pixel region 12 and a non-pixel region located around the pixel region 12. In addition, the vertical scanning circuit 110, the horizontal scanning circuit 111, the readout circuit 112, the output circuit 114, and the control pulse generation unit 115 are disposed in a region overlapping the non-pixel region in a planar view.

Note that the placement location of the vertical signal line 113 and the placement location of the readout circuit 112 and the output circuit 114 are not limited to the example as shown in FIG. 3. For example, the vertical signal line 113 is disposed to extend in the row direction, and the readout circuit 112 may be located at the ends to which the vertical signal line 113 extends. Additionally, the signal processing circuit 103 does not necessarily need to be provided for each of all the photoelectric conversion units, and one signal processing unit may be shared for a plurality of photoelectric conversion units so that signal processing is sequentially performed.

Figure 4:
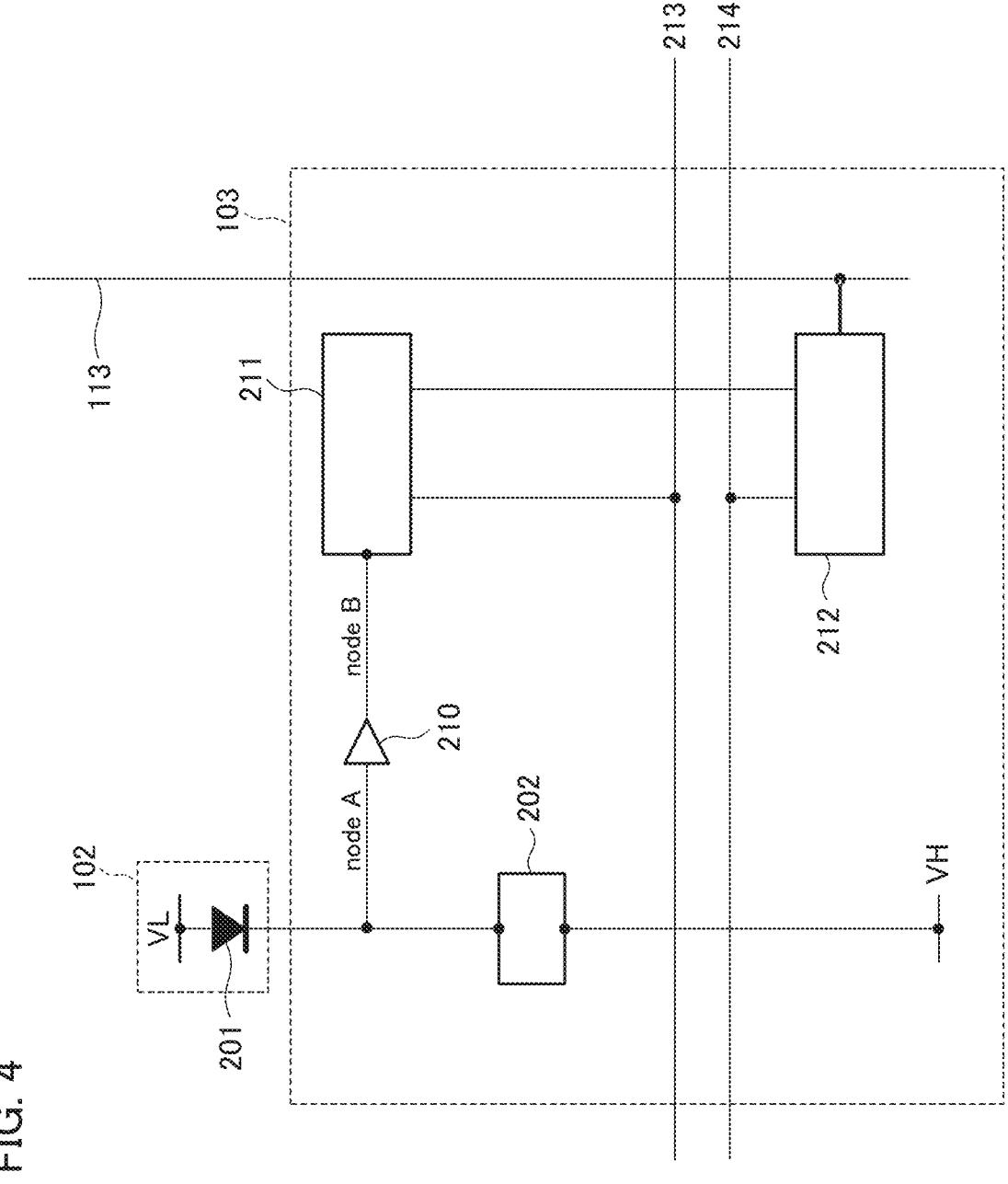
FIG. 4 is a diagram showing the pixel 101 in FIG. 2 and FIG. 3 and an equivalent circuit of the signal processing circuit 103 corresponding to the pixel 101.

FIG. 4 is a diagram showing the pixel 101 in FIG. 2 and FIG. 3 and an equivalent circuit of the signal processing circuit 103 corresponding to the pixel 101.

The APD 201 included in the photoelectric conversion unit 102 generates charge pairs corresponding to incident light by photoelectric conversion. One of two nodes of the APD 201 is connected to a power supply line to which a drive voltage VL (first voltage) is supplied. Additionally, the other node of the two nodes of the APD 201 is connected to a power supply line to which a drive voltage VH (second voltage) higher than the voltage VL is supplied.

In FIG. 4, one node of the APD 201 is an anode and the other node of the APD 201 is a cathode. A reverse bias voltage is supplied to the anode and the cathode of the APD 201 so that the APD 201 performs an avalanche multiplication operation. By supplying such a voltage, the charge generated by the incident light causes avalanche multiplication, and an avalanche current is generated.

Note that, in a case in which a reverse bias voltage is supplied, there are a Geiger mode in which operation is performed with a voltage difference between the anode and the cathode that is larger than the breakdown voltage, and a linear mode in which operation is performed with a voltage difference between the anode and the cathode that is close to or lower than the breakdown voltage. The APD operated in the Geiger mode is referred to as "SPAD". In the case of the SPAD, for example, the drive voltage VL (first voltage) is −30V, and the drive voltage VH (second voltage) is 1V.

The signal processing circuit 103 has a quenching element 202, a waveform shaping unit 210, a counter circuit 211, and a memory circuit 212. The quenching element 202 is connected to a power line to which the driving voltage VH is supplied and one node of an anode and a cathode of the APD 201.

The quenching element 202 functions as a load circuit (quenching circuit) during signal multiplication by avalanche multiplication, and has a function of suppressing avalanche multiplication by suppressing the voltage supplied to the APD 201 (quenching operation). Additionally, the quenching element 202 has a function of returning the voltage supplied to the APD 201 to the driving voltage VH by causing a current corresponding to a voltage drop in the quenching operation to flow (recharging operation).

FIG. 4 illustrates an example in which the signal processing circuit 103 has the waveform shaping unit 210, the counter circuit 211, and the memory circuit 212, in addition to the quenching element 202.

The waveform shaping unit 210 shapes a voltage change of the cathode of the APD 201 obtained during detection of photons, and outputs a pulse signal. For example, an inverter circuit is used for the waveform shaping unit 210. Although, in FIG. 4, an example in which one inverter is used as the waveform shaping unit 210 is shown, a circuit in which a plurality of inverters is connected in series may be used, or another circuit having a waveform shaping effect may be used.

The counter circuit 211 counts the number of pulses that have been output from the waveform shaping unit 210, and holds the count value. Additionally, when the control pulse RES is supplied via a driving line 213, the signal held in the counter circuit 211 is reset. Here, the counter circuit 211 generates signals based on the difference between the count values at a start time and an end time of the accumulation time period.

The memory circuit 212 is supplied with a control pulse SEL from the vertical scanning circuit 110 of FIG. 3 via a driving line 214 (not illustrated in FIG. 3) of FIG. 4, and switches electrical connection and non-connection between the counter circuit 211 and the vertical signal line 113. The memory circuit 212 functions as a memory that temporarily stores the count value of the counter, and outputs the output signals from the counter circuit 211 of the pixel to the vertical signal line 113.

Note that a switch, for example, a transistor may be disposed between the quenching element 202 and the APD 201 or between the photoelectric conversion unit 102 and the signal processing circuit 103 to switch the electrical connection. Similarly, a switch, for example, a transistor may be used to electrically switch the supply of the driving voltage VH or the driving voltage VL supplied to the photoelectric conversion unit 102.

Figure 5:
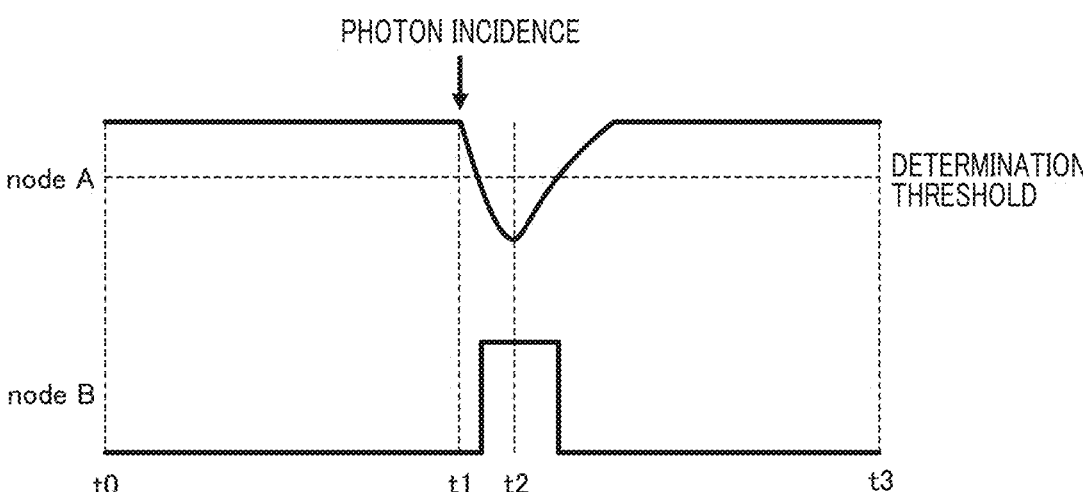
FIG. 5 is a schematic diagram showing the relation between the operation of the APD 201 and the output signals.

FIG. 5 is a diagram schematically showing the relation between the operation of the APD 201 and the output signals. The input side of the waveform shaping unit 210 is referred to as a nodeA, and the output side thereof is referred to as a nodeB. From time t0 to time t1, a potential difference of VH-VL is applied to the APD 201. When a photon is incident on the APD 201 at time t1, avalanche multiplication occurs in the APD 201, an avalanche multiplication current flows through the quenching element 202, and the voltage of the nodeA drops.

When the voltage drop amount further increases and the potential difference applied to the APD 201 decreases, the avalanche multiplication of the APD 201 stops as at time t2, and the voltage level of the node A does not decrease to a certain value or less.

Subsequently, during a period from time t2 to time t3, a current that compensates for a voltage drop from the voltage VL flows in the nodeA, and the nodeA is stabilized at the original electric potential level at time t3. At this time, a portion where the output waveform exceeds a certain threshold in the nodeA is waveform-shaped by the waveform shaping unit 210, and output as a pulse signal in the nodeB.

Figure 6:
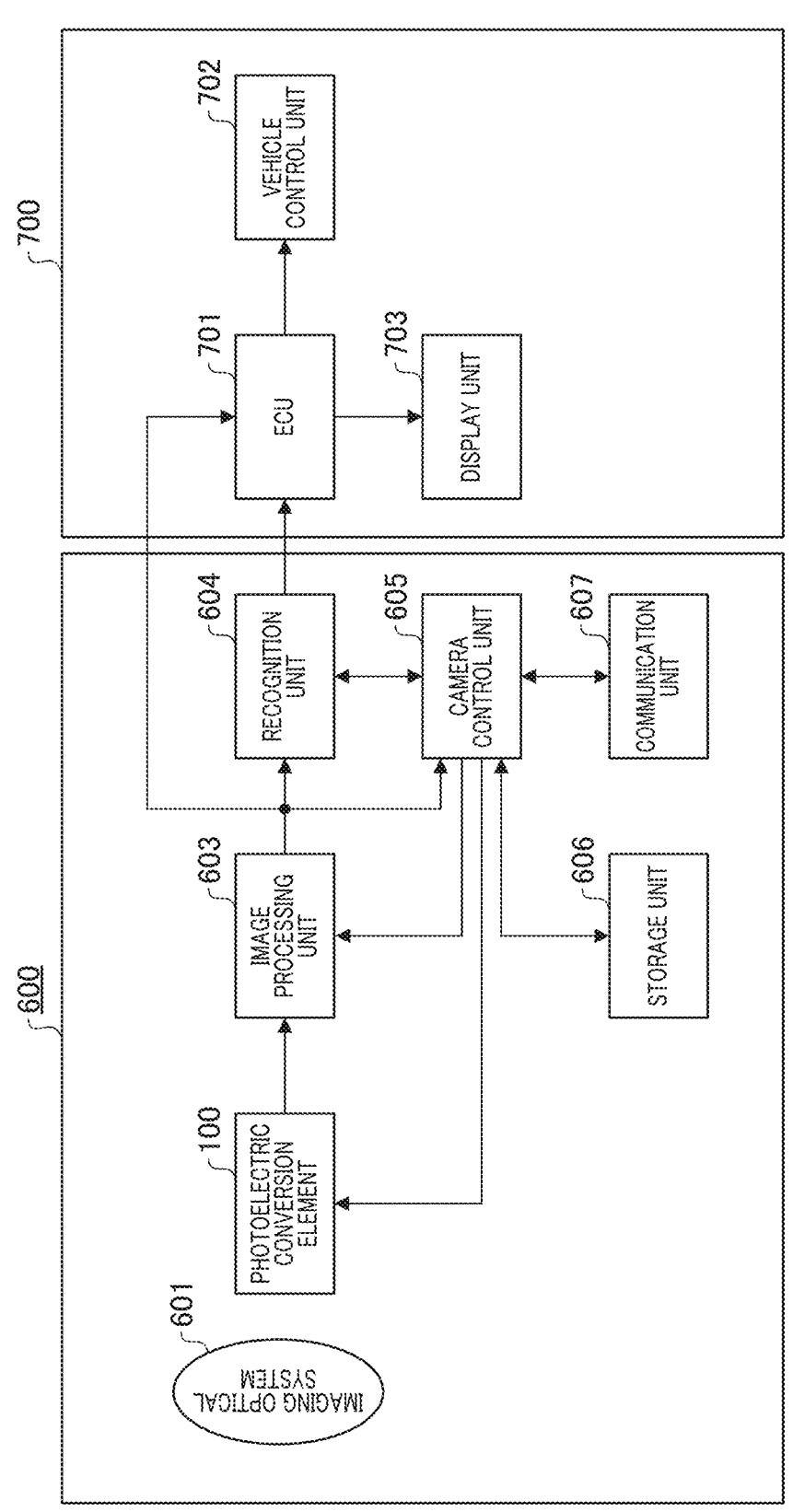
FIG. 6 is a functional block diagram of a photoelectric conversion device 600 and a movable apparatus 700 according to the embodiment.

Next, the photoelectric conversion device 600 and the movable apparatus 700 according to the embodiment will be explained. FIG. 6 is a functional block diagram of the photoelectric conversion device 600 and the movable apparatus 700 according to the embodiment. Note that some of the functional blocks as shown in FIG. 6 are realized by causing a computer (not illustrated) included in the photoelectric conversion device 600 and the movable apparatus 700 to execute a computer program stored in a memory serving as a storage media (not illustrated).

However, some or all of them may be realized by hardware. As the hardware, a dedicated circuit (ASIC), a processor (reconfigurable processor, DSP), and the like can be used. Additionally, each of the functional blocks as shown in FIG. 6 need not be incorporated in the same housing, and may be configured by separate devices that are connected to each other via a signal path. Note that the above explanation of FIG. 6 also applies to FIG. 12 to be described below.

The photoelectric conversion device 600 has the photoelectric conversion element 100 that has been described with reference to FIG. 1 to FIG. 5, an imaging optical system 601, the image processing unit 603, a recognition unit 604, the camera control unit 605, a storage unit 606, a communication unit 607, and the like. The photoelectric conversion element 100 is configured by the avalanche photodiode that has been explained with reference to FIG. 1 to FIG. 5 for photoelectrically converting an optical image.

The photoelectric conversion device in the embodiment is mounted on the movable apparatus 700, and a camera unit comprising a set of the imaging optical system 601 and the photoelectric conversion elements 100 is configured to capture an image of, for example, at least one direction of a forward direction, a backward direction, and a side direction of the movable apparatus. Note that a plurality of camera units may be provided on the movable apparatus 700.

The image processing unit 603 performs image processing such as black level correction, gamma curve adjustment, noise reduction, digital gain adjustment, demosaic processing, data compression, and the like on the image signal that has been acquired by the photoelectric conversion element 100, and generates a final image signal. Note that in a case where the photoelectric conversion element 100 has an on-chip color filter including RGB and the like, it is desirable that processing such as white balance correction and color conversion is performed in the image processing unit 603.

Additionally, the output from the image processing unit 603 is supplied to the recognition unit 604, an electric control unit (ECU) 701 of the movable apparatus 700, and the camera control unit 605. The recognition unit 604 recognizes a surrounding a person, a vehicle, and the like by performing image recognition based on the image signal, and issues a warning and the like as necessary.

Although, in the present embodiment, the movable apparatus 700 will be explained using an example of an automobile, the movable apparatus may be any movable apparatus, for example, an aircraft, a train, a ship, a drone, an AGV, and a robot.

The camera control unit 605 incorporates a CPU serving as a computer and a memory that stores a computer program, and controls each unit of the photoelectric conversion device 600 by the CPU executing the computer program stored in the memory.

Note that the camera control unit 605 performs, for example, the control of the length of the accumulation period, the number of times of accumulation of each frame of the photoelectric conversion element 100, the control of accumulation, the timing of the control signal CLK, and the like via the control pulse generation unit of the photoelectric conversion element 100. Details of the camera control unit 605 will be described below with reference to FIG. 12.

The storage unit 606 includes a recording medium, for example, a memory card and a hard disk, and can store and read out image signals. The communication unit 607 includes a wireless or wired interface, outputs a generated image signal to the outside of the photoelectric conversion device 600, and receives various signals from the outside.

The ECU 701 incorporates a CPU serving as a computer and a memory storing a computer program, and the CPU executes the computer program stored in the memory to control each unit of the movable apparatus 700.

The output of the ECU 701 is supplied to a vehicle control unit 702 and a display unit 703. The vehicle control unit 702 functions as a motion control unit that performs driving, stopping, direction control, and the like of a vehicle serving as a movable apparatus, based on the output of the ECU 701. Note that the vehicle control unit 702 serving as the motion control unit controls an operation of the movable apparatus based on a result of recognition processing using signals generated in at least a first accumulation period.

Additionally, the display unit 703 includes a display device, for example, a liquid crystal device and an organic EL, and is mounted on the movable apparatus 700. The display unit 703 displays an image acquired by the photoelectric conversion element 100 and various kinds of information on a traveling state of the vehicle to a driver of the movable apparatus 700 by using, for example, a GUI based on the output of the ECU 701.

Note that the image processing unit 603, the recognition unit 604, and the like in FIG. 6 need not be mounted on the movable apparatus 700, and may be provided in, for example, an external terminal and the like that are provided separately from the movable apparatus 700 so that the movable apparatus 700 is remotely controlled or the traveling of the movable apparatus is monitored.

Figure 7:
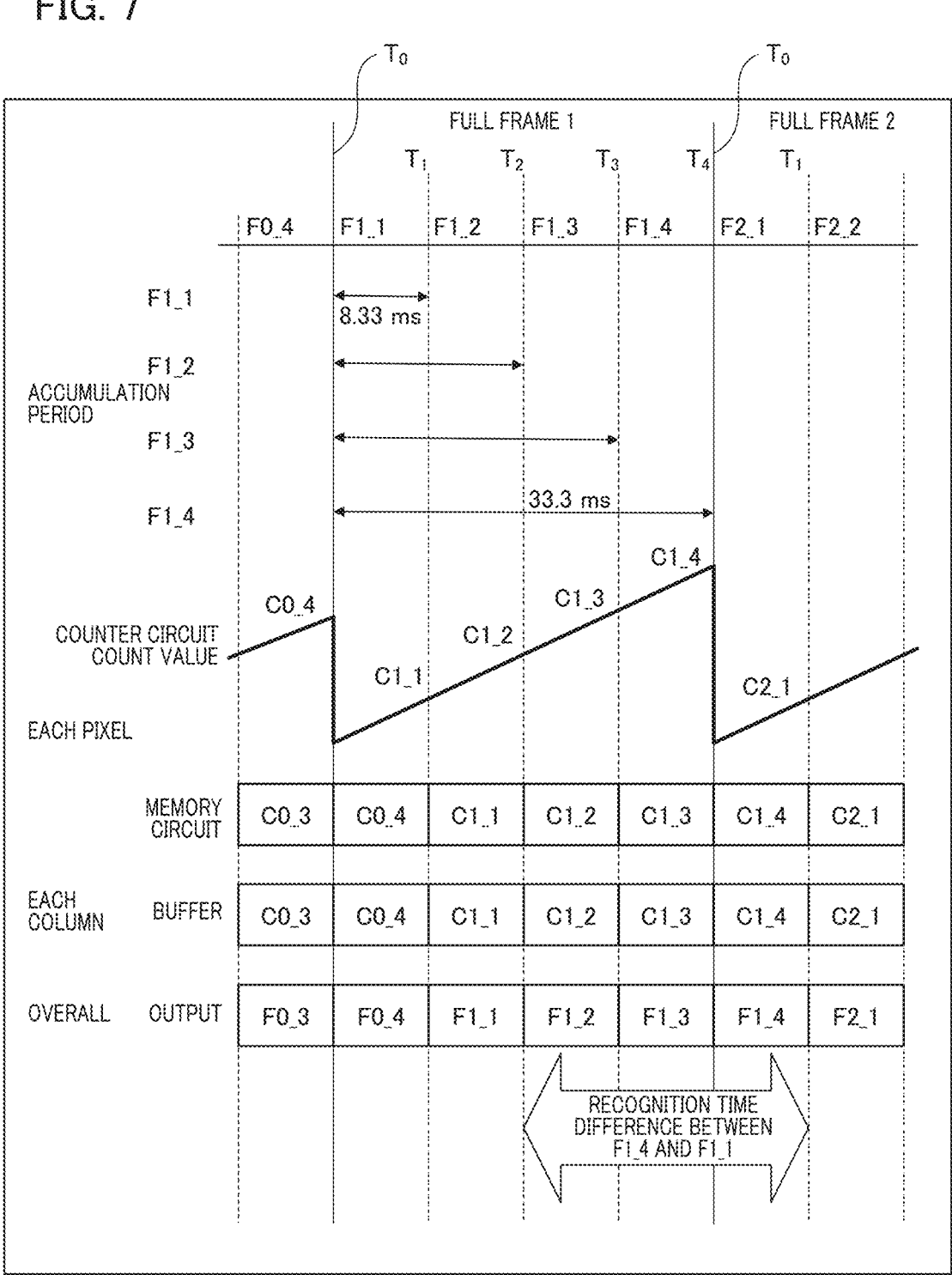
FIG. 7 is a diagram for explaining a photoelectric conversion method performed by a camera control unit 605 according to the embodiment.

FIG. 7 is a diagram for explaining a photoelectric conversion method performed by the camera control unit 605 according to the embodiment. In the present embodiment, photoelectric conversion is periodically performed at, for example, 30 full frames/sec. Note that, in the present embodiment, one frame having a length of 33.3 ms is referred to as a full frame period (or a main frame), and a frame obtained by dividing the full frame period into four is referred to as a frame (or a sub-frame).

That is, as shown in FIG. 7, the full frame 1 from time T0 to time T12 is divided into frames 1_1, 1_2, 1_3, and 1_4 by an equal time period (8.33 ms). Note that, in FIG. 7 and subsequent drawings, the frames 0_3, 0_4, 1_1, 1_2, 1_3, 1_4, 2_1, and 2_2 are denoted by F0_3, 0_4, 1_1, 1_2, 1_3, 1_4, 2_1, and 2_2.

Note that the frame 1_1 has an accumulation period from time T0 to time T1 of the full frame 1, the frame 1_2 has an accumulation period from time T0 to time T2. Additionally, the frame 1_3 has an accumulation period from time T0 to time T3, and the frame 1_4 has an accumulation period from time T0 to time T4. In the present embodiment, for example, the accumulation period from time T0 to time T1 is referred to as a first accumulation period, and the accumulation period from time T0 to time T4 is referred to as a second accumulation period.

Then, the counter circuit 211 is reset at time T0, and each of the count values C1_1, C1_2, C1_3, and C1_4 is acquired from the counter circuit 211 at times T1 to T4.

Additionally, the count values C1_1, C1_2, C1_3, and C1_4 are temporarily stored in the memory circuit 212. Then, the signals for one row that has temporarily been stored in the memory circuit 212 are sequentially output from the photoelectric conversion elements via the buffer of the readout circuit 112.

As described above, according to the present embodiment, the signals accumulated in the time period of the frame 1_1 are read out from time T1 to the time T2, and are processed by the recognition unit 604. Thus, it is possible to quickly perform image recognition. Similarly, the signals accumulated in the time periods of the frame 1_2, the frame 1_3, and the frame 1_4 are sequentially read out from times T2 to T3, T3 to T4, and T4 to T1, and thereby image recognition can be repeatedly performed.

Figure 8:
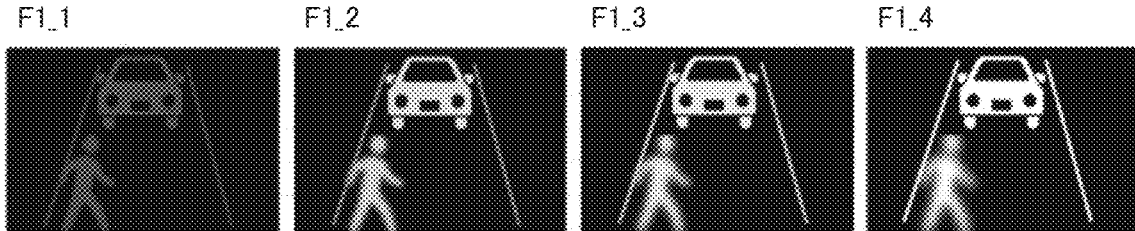
FIG. 8 is a diagram that illustrates an example of an image of a plurality of divided frames.

FIG. 8 is a diagram illustrating an example of images of a plurality of divided frames. As shown in FIG. 8, the image of the frame 1_1 is dark because the accumulation period is short, whereas the object blur of the person running out is small. In contrast, since the accumulation period becomes longer in the order of the frame 1_2, the frame 1_3, and the frame 1_4, the object blur is more likely to occur. Note that blur is less likely to occur in a stopped vehicle and a white line, and the contrast is more likely to be improved as the accumulation period is longer.

As described above, in the present embodiment, the accumulation operations for the first accumulation period and the second accumulation period are performed within one full frame period. Additionally, the control is performed such that the first accumulation period is shorter than the second accumulation period, and a signal generated in the first accumulation period is output from the end of the first accumulation period to the end of the second accumulation period.

Additionally, in the present embodiment, the first accumulation period and the second accumulation period overlap with each other, and the first accumulation period and the second accumulation period start at the same time. Furthermore, the end time of the second accumulation period is a separation of the full frame period, and the second accumulation period is an integral multiple of the first accumulation period. That is, the end time of the second accumulation period coincides with the end time of the full frame period.

However, the second accumulation period need not be an integral multiple of the first accumulation period. It suffices if the second accumulation period is longer than the first accumulation period and the end of the second accumulation period is later than the end of the first accumulation period.

Specifically, an image having a short accumulation period and an image having a long accumulation period are generated, the timing at which the short accumulation period ends is set earlier than the timing at which the long accumulation period ends, and this image is output immediately after the short accumulation period ends and sent to the recognition unit in the subsequent stage. Then, the object is recognized based on the signal generated in at least the first accumulation period. The recognition unit 604 recognizes an object based on the signal generated in at least the first accumulation period.

Therefore, in contrast to the conventional technique in which image recognition cannot be performed until one full frame period has passed, in the present embodiment, image recognition can be performed after ¼ full frame period at the earliest, so that, when, for example, a movable apparatus is moving at high speed, an obstacle and the like can be recognized quickly. Therefore, it is possible to apply the brake quickly and the like. Alternatively, an obstacle can be avoided at an early stage.

Note that an image having a long accumulation period can improve the contrast and thus can be used as a display image. That is, an image having a short accumulation period is suitable for quick object recognition, and an image having a long accumulation period is suitable for a display image. As described above, the display apparatus of the present embodiment displays the signal generated in at least the second accumulation period as an image. Note that the recognition unit 604 may further recognize an object based on the signal generated in the second accumulation period.

Additionally, in the present embodiment, since an APD is used, and unlike a CMOS sensor, the accumulated electric charge is not degraded by readout, and therefore, the accumulation periods can be overlapped. Additionally, since there is no readout noise, the original signal does not deteriorate even if the signal is read out many times in one accumulation.

Figure 9:
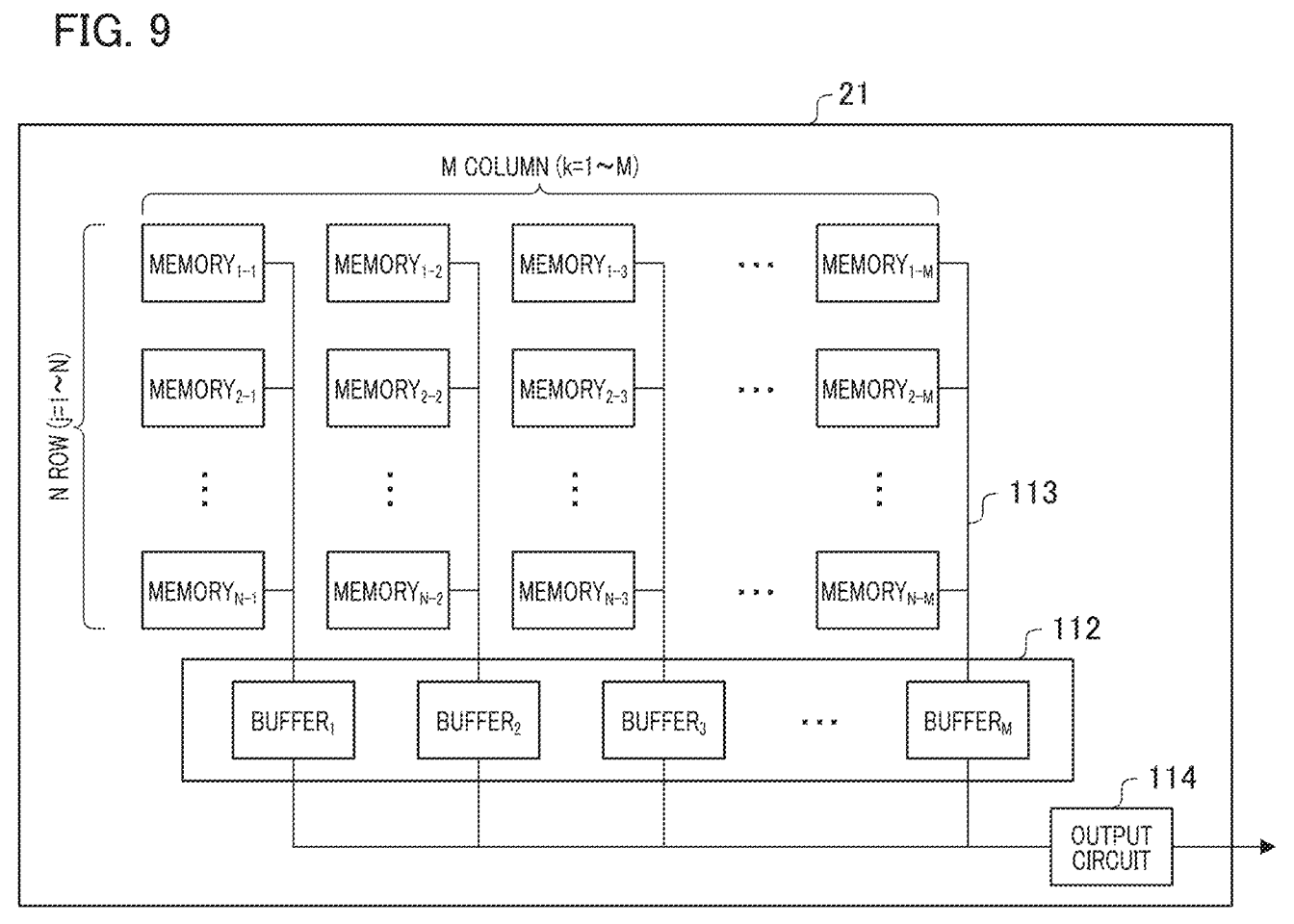

FIG. 9 is a diagram illustrating a relation between a memory circuit and a buffer in the embodiment. In FIG. 9, a state in which the memory circuits 212 in the signal processing circuit 103 of FIG. 3 are arranged in N rows and M columns is illustrated, and each memory circuit is represented as a memory 1-1 to a memory N-M. Additionally, a buffer 1 to a buffer M in FIG. 9 indicate buffers included in the readout circuit 112 in FIG. 3. The output circuit 114 in FIG. 9 corresponds to the output circuit 114 in FIG. 3.

Figure 10:
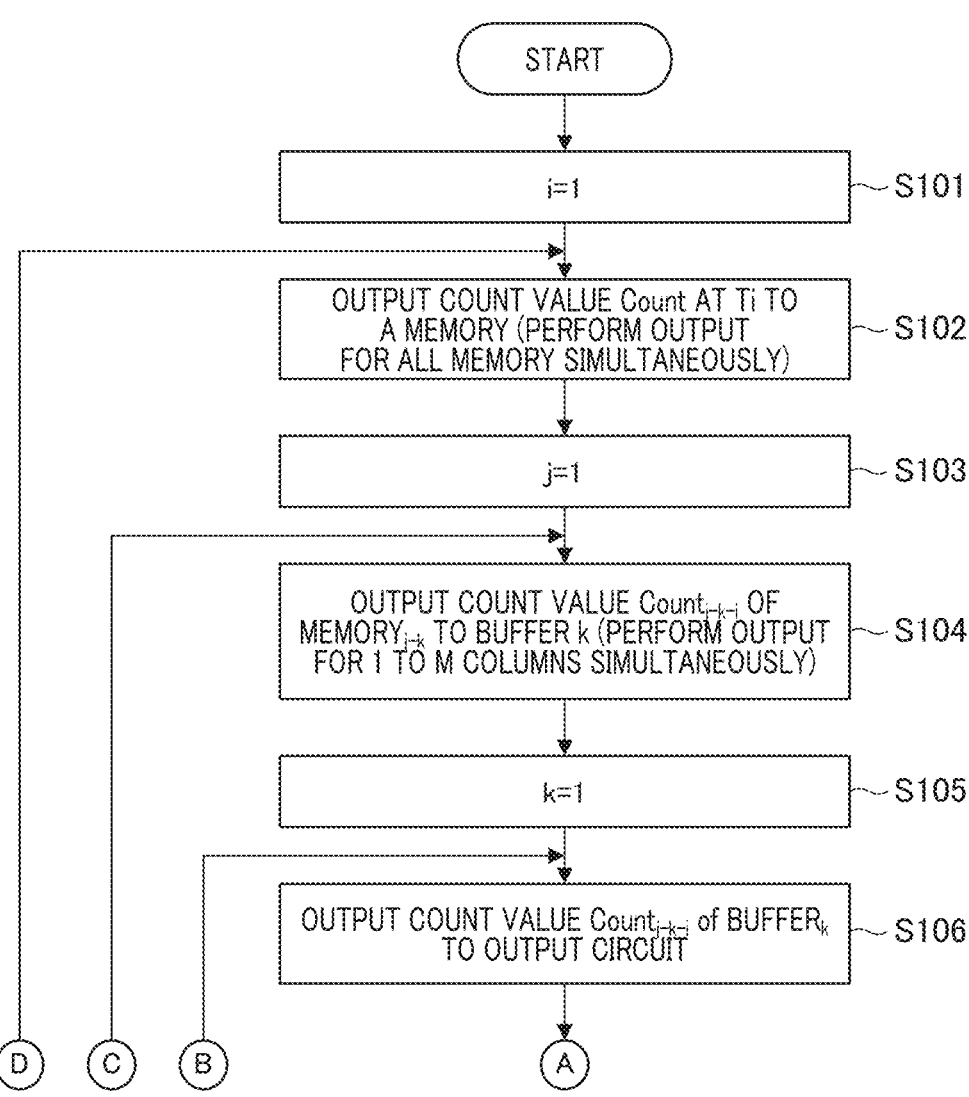
FIG. 10 is a flow chart showing details of an example of driving a photoelectric conversion element in the embodiment.
Figure 11:
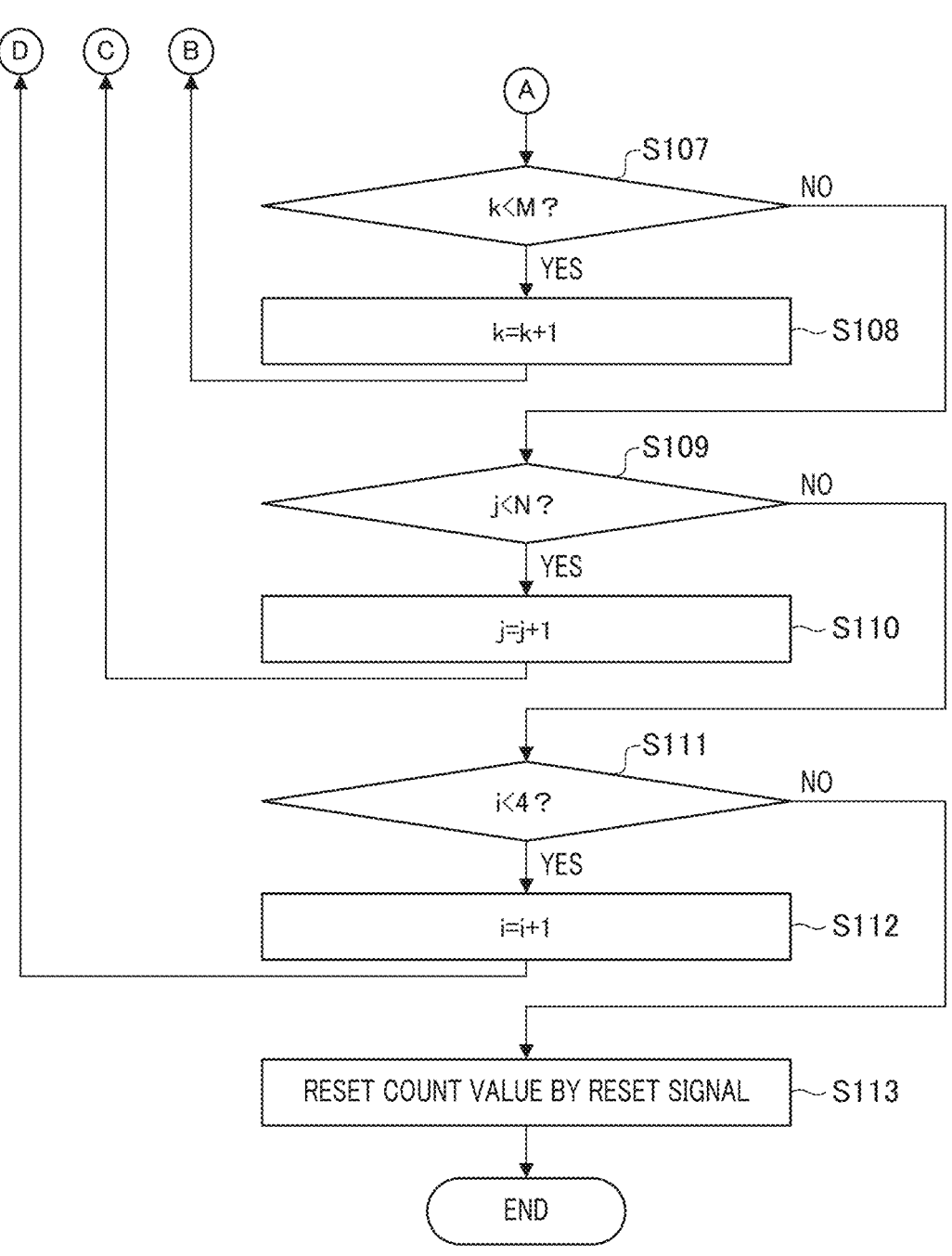
FIG. 11 is a flowchart continued from FIG. 10.

FIG. 10 is a flowchart showing details of an example of driving of the photoelectric conversion element in the embodiment, and FIG. 11 is a flowchart continued from FIG. 10. Note that the CPU serving as a computer in the camera control unit 605 executes a computer program stored in the memory, and thereby, the operations of each step in the flowcharts of FIG. 10 and FIG. 11 are sequentially performed.

In step S101 of FIG. 10, the CPU in the camera control unit 605 sets i=1, and, in step S102, it outputs the count value Count of the counter circuit 211 at time Ti to the memory circuit 212. At this time, the output to all the memory circuits is simultaneously performed. This operation corresponds to the operation at time T1 of FIG. 7.

Next, in step S103, the CPU in the camera control unit 605 sets j=1, and, in step S104, it outputs the count value Count (j-k-i) in the memory circuit j-k in FIG. 9 to the buffer. At this time, output to the buffer is performed simultaneously for columns 1 to M. This operation means an operation of storing the count value in the first row of FIG. 9 into the buffer.

Next, in step S105, the CPU in the camera control unit 605 is set to k=1, and in step S106, the count value Count (j-k-i) of buffer k is output to the output circuit 114. This operation corresponds to an operation of reading out the signals of the buffer in the leftmost column of FIG. 9 from the output circuit.

Next, the process proceeds to step S107 in FIG. 11 via A, and in step S107, the CUP in the camera control unit 605 determines whether or not k<M is satisfied, and when the result of determination is "YES", in step S108, k is incremented by 1 by assuming k=k+1, the process returns to step S106 via B, and the operation in step S106 is performed. This operation corresponds to the operation of reading out the signals of the buffer in the second column from the left in FIG. 9 from the output circuit.

In a case where the result of determination is "NO" in step S107, that is, in a case where k=M is satisfied, it means that the signals of the buffer in the M-th column in FIG. 9 has finished being read out from the output circuit, and the process next proceeds to step S109, in which the CPU in the camera control unit 605 determines whether or not j<N is satisfied.

In the result of determination in step S109 is "YES", in step S110, the CPU in the camera control unit 605 sets j=J+1, increments j by 1, and the process returns to step S104 via C. This corresponds to an operation for starting the readout of the next row.

If the result of determination in step S109 is "NO", which means that readout of all the rows has been completed, the process proceeds to step S111, in which the CPU in the camera control unit 605 determines whether or not j<4 is satisfied. When the result of the determination in step S111 is "YES", the process proceeds to step S112, in which the CPU in the camera control unit 605 sets i=i+1 and increments i by 1, and the process returns to step S102 via D. This operation corresponds to an operation of starting readout of the next time T2.

If the result of the determination in step S111 is "NO", which means that the readout at time T4 has been completed, the process proceeds to step S113, in which the CUP in the camera control unit 605 resets the counter circuit 211 with a reset signal. This operation corresponds to the reset operation of the counter circuit 211 at time T4 in FIG. 7. As described above, the signals accumulated in the photoelectric conversion element 100 can be sequentially read out.

Figure 12:
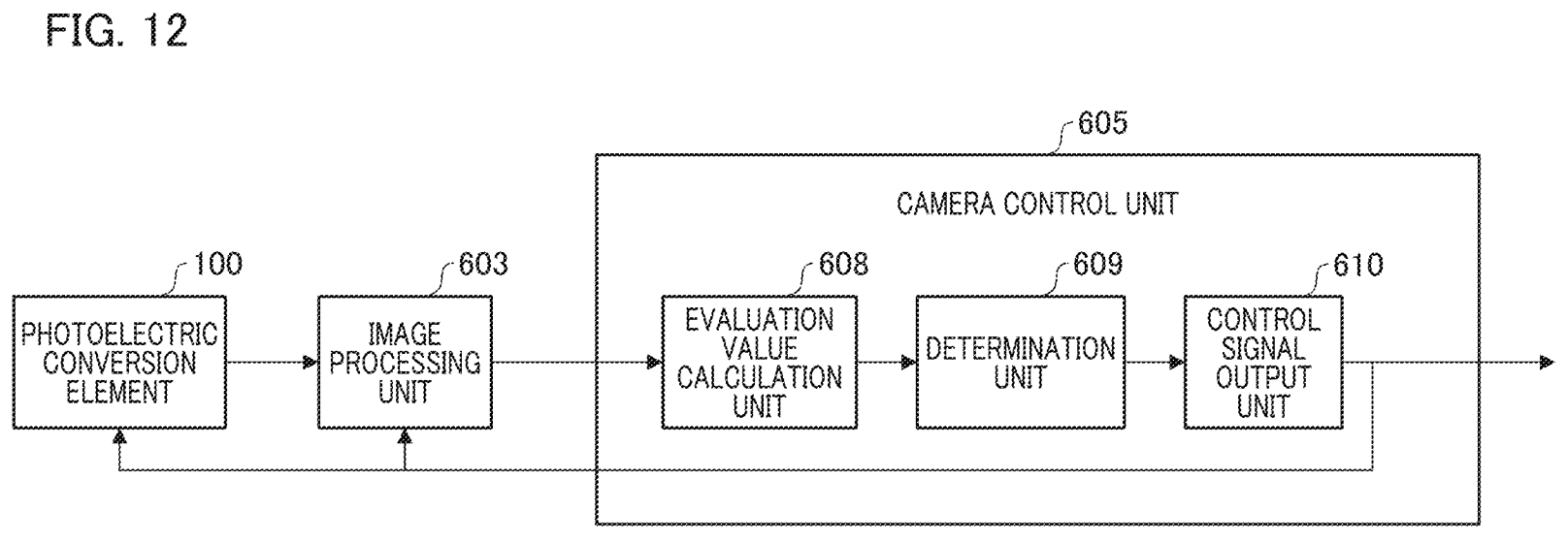

Next, an example of a configuration of the camera control unit 605 will be explained with reference to FIG. 12. FIG. 12 is a functional block diagram illustrating the input/output relations between the photoelectric conversion element 100, the image processing unit 603, and the camera control unit 605, and an example of a detailed configuration of the camera control unit 605.

The camera control unit 605 has an evaluation value calculation unit 608 and a determination unit 609, and controls, for example, the length of the accumulation period, the number of times of accumulation of each frame of the photoelectric conversion element 100, accumulation, and the timing of the control signal CLK via the control pulse generation unit of the photoelectric conversion element 100.

The evaluation value calculation unit 608 calculates an evaluation value from the count value of the image signal having a short accumulation period, and outputs the calculation result to the determination unit 609.

The determination unit 609 determines whether to change the number of times of accumulation and the length of each accumulation period within the same full frame period based on the evaluation value that has been output from the evaluation value calculation unit 608, and outputs the determination result to a control signal output unit 610.

Figure 13:
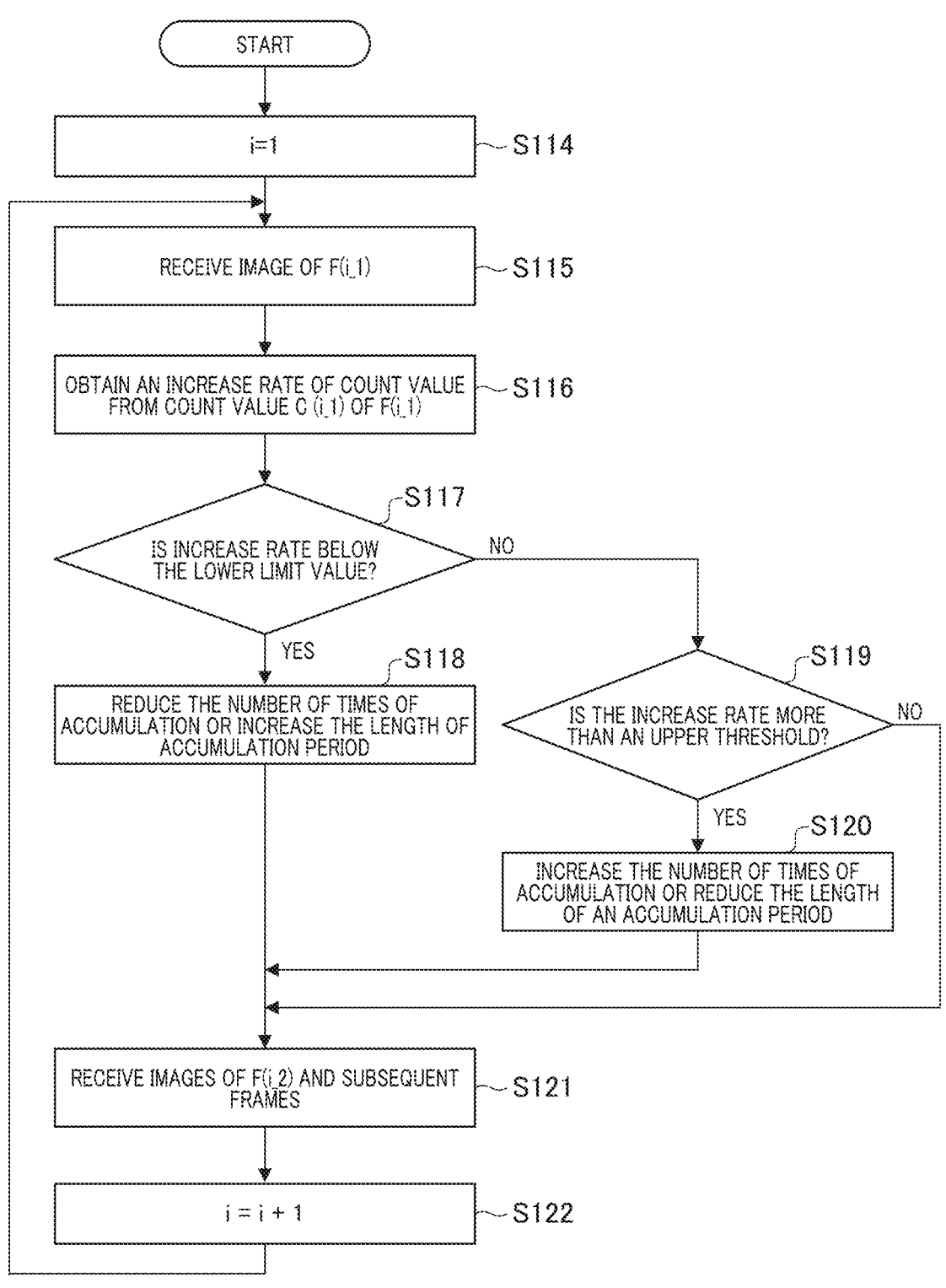
FIG. 13 is a flowchart showing details of an operation example of the camera control unit 605 in the embodiment.

The control signal output unit 610 outputs a control signal to the photoelectric conversion element 100 according to the determination result that has been output from the determination unit 609 so that the number of times of accumulation and the length of each accumulation period within the same full frame period are changed. FIG. 13 is a flowchart showing details of an operation example of the camera control unit 605 in the embodiment. Note that the CPU serving as a computer in the camera control unit 605 executes a computer program stored in the memory, thereby the operation of each step in the flowchart of FIG. 13 is sequentially performed.

In step S114 of the drawing, the CPU in the camera control unit 605 sets i=1, and in the next step S115, it receives the value Count (i_1) of the frame (i_1) count from the image processing unit 603.

In the next step S116, the CPU in the camera control unit 605 causes the evaluation value calculation unit 608 to calculate the mean value of the count values Count (i_1) of the frame (i_1), and calculate the number of increases in the count value per unit time, that is, the increase rate, from the calculated mean value. Here, the number of increases in the count value per unit time, that is, the increase rate corresponds, for example, to the result of evaluating the signal generated in the first accumulation period.

In the next step S117, the CPU in the camera control unit 605 causes the determination unit 609 to determine whether or not the increase rate is lower than the lower limit threshold. Specifically, it is determined whether or not the number of increases in the count value per unit time calculated by the evaluation value calculation unit 608 is less than the minimum number of increases in the count value per unit time (hereinafter, referred to as a "lower limit threshold") at which the recognition unit 604 can recognize an object.

In a case where the result of determination in S117 is "YES", the process proceeds to step S118. In the next step S118, the CPU in the camera control unit 605 increases the length of the accumulation period of the frame (i_2) and subsequent frames by the control pulse generation unit 115 via the control signal output unit 610. Alternatively, a control signal is output to the photoelectric conversion element 100 so that the number of times of accumulation is reduced, and the process proceeds to step S121.

Figure 14:
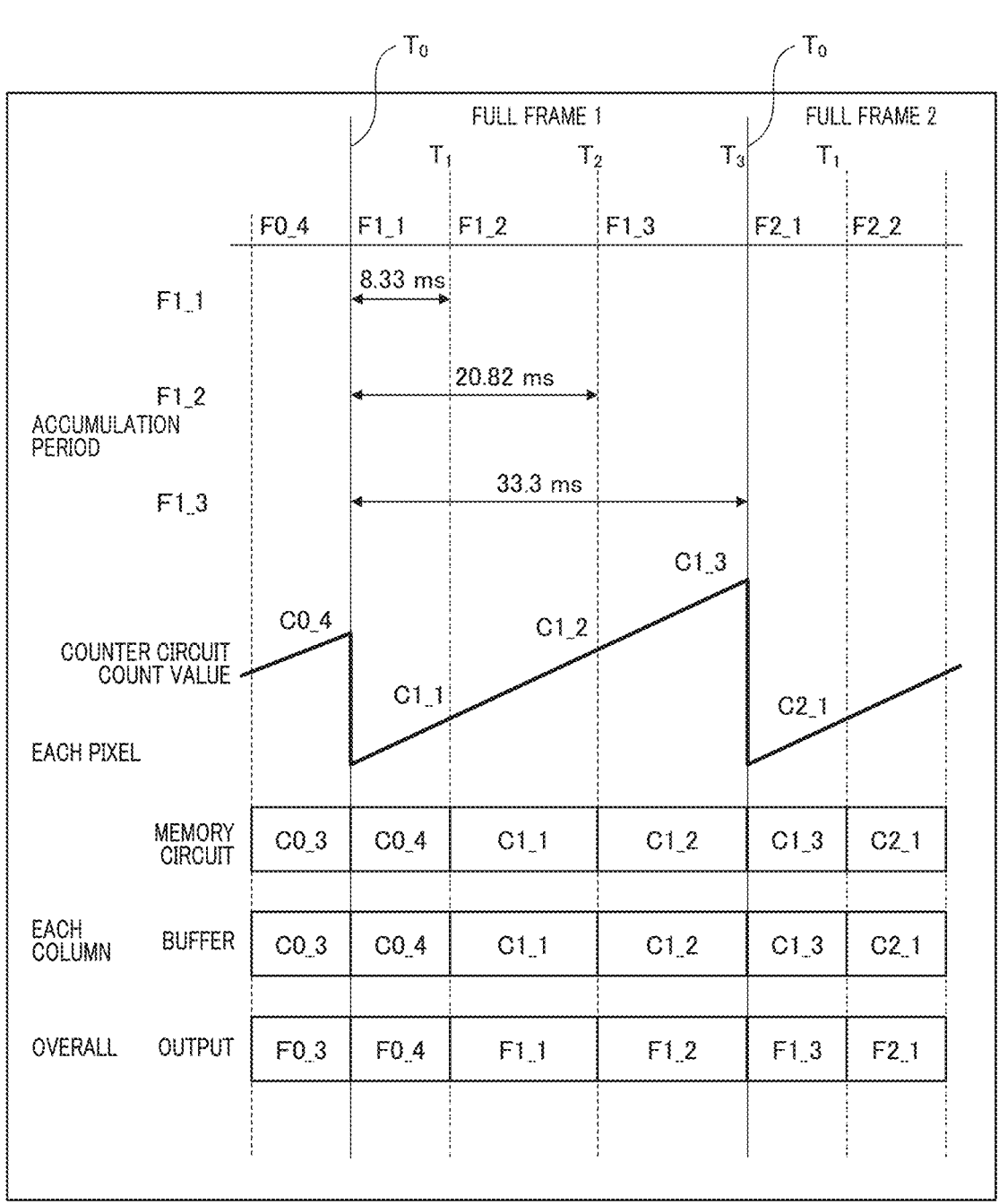
FIG. 14 is a diagram for explaining an example of a photoelectric conversion method performed by the camera control unit 605 in a case in which the number of times of accumulation is reduced, according to the embodiment.

FIG. 14 is a diagram for explaining an example of a photoelectric conversion method performed by the camera control unit 605 in a case where the number of accumulations is reduced, according to the embodiment. FIG. 14 shows an example in which the number of times of accumulation in one full frame period is reduced from four times to three times in step S118, and the interval at which frames of frame (i_2) and subsequent frames are read out is changed for each 12.49 ms.

In a case where the result of determination is "NO" in step S117, the process proceeds to step S119. In the next step S119, the CPU in the camera control unit 605 causes the determination unit 609 to determine whether or not the increase rate exceeds the upper limit threshold.

Specifically, in step S119, it is determined whether or not the number of increases in the count value per unit time calculated by the evaluation value calculation unit 608 is more than the maximum number of increases in the count value per unit time (hereinafter, referred to as a "upper limit threshold") at which the recognition unit 604 can recognize an object.

In a case where the result of determination is "YES" in step S119, the process proceeds to step S120. In the next step S120, the CPU in the camera control unit 605 reduces the length of the accumulation period of the frame (i_2) and subsequent frames by the control pulse generation unit 115 via the control signal output unit 610. Alternatively, a control signal is output to the photoelectric conversion element 100 so that the number of times of accumulation is increased, and the process proceeds to step S121.

Figure 15:
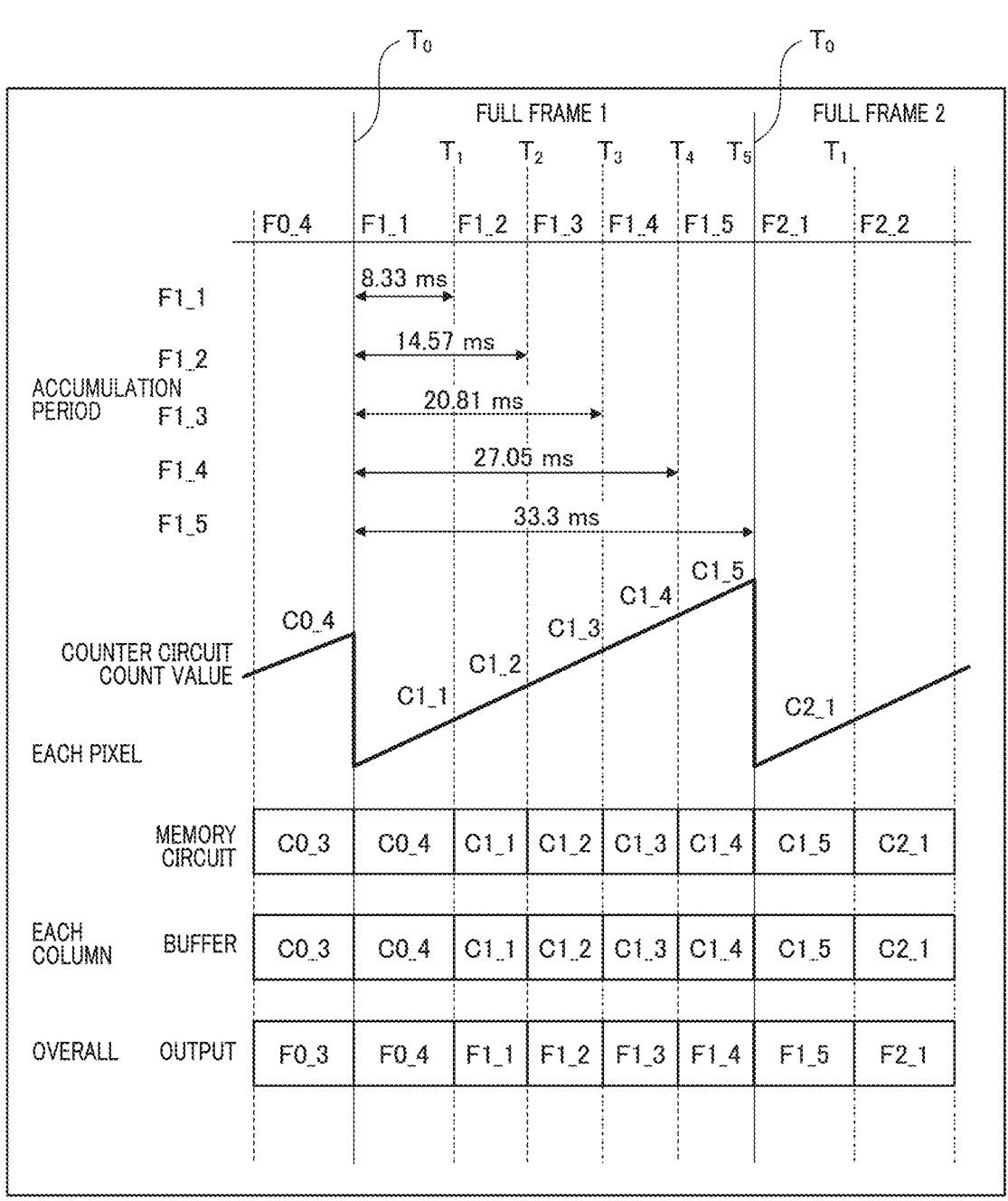
FIG. 15 is a diagram for explaining an example of a photoelectric conversion method performed by the camera control unit 605 in a case in which the number of times of accumulation has been increased, according to the embodiment.

FIG. 15 is a diagram for explaining an example of a photoelectric conversion method performed by the camera control unit 605 in a case where the number of times of accumulation is increased, according to the embodiment. FIG. 15 illustrates an example in which the number of times of accumulation in one full frame period is increased from four times to five times in step S120, and the interval at which the frame (i_2) and subsequent frames are read out is changed for each 6.24 ms.

In a case where the result of determination in step S119 is "NO", the process proceeds to step S121. In the next step S121, the CPU in the camera control unit 605 receives an image of the frame (i_2) and subsequent frames from the image processing unit, and in step S122, it sets i=i+1 and increases i by 1, and the process returns to step S115.

As described above, in steps S116 to S120, the number of times or a length of the accumulation period of another accumulation operation within the same full frame period are controlled based on the result of evaluating the signal generated in the first accumulation period.

By performing a control as described above, it is possible to realize a photoelectric conversion device in which the result of short-time accumulation can be read out in the middle and the accumulation period can be optimized according to a change in the brightness of the environment, for example, at night and in the daytime.

Note that although, in the above-described embodiment, accumulation for the shortest ¼ full frame period is performed, the length of the shortest accumulation period may be changed to, for example, ⅕ full frame period or ⅓ full frame period.

Furthermore, even in a case where the readout cycle is set to every ¼ full frame period, the counter circuit may be reset in the middle of the accumulation period of the frame 1-1 in FIG. 7 according to the brightness of an object, the image recognition accuracy, and the like. Thus, the substantial accumulation period may be set to be shorter than the ¼ full frame period.

Alternatively, for example, at time T1 in FIG. 7, the counter circuit may be temporarily reset. Thereby, the count value read out at time T4 may be adjusted.

In addition, although, in the above-described embodiment, the number of increases in the count value per unit time calculated from the mean value of the count values is used as an evaluation value, the number of increases of the mode value of the count values and the like may be used as an evaluation value. Alternatively, the evaluation value may be calculated from the smallest count value or the largest count value among all the pixels of the frame. That is, when making an evaluation, the evaluation may be performed by using the number of increases per unit time of the minimum value or the maximum value from among the signals generated in the first accumulation period.

Alternatively, the number of increases in the count value per unit time, which is used as an evaluation value may also use a histogram of the count values of all the pixels of the frame. That is, evaluation may be performed by using a histogram of signals generated in the first accumulation period.

Additionally, a control may be performed so that the recognition result (for example, a degree of recognition reliability) of the object is output from the recognition unit 604 to the determination unit 609, and the determination unit 609 changes the number of accumulations and the length of each accumulation period in the same full frame period based on the recognition result. That is, the number of times or the length of the accumulation period of another accumulation operation within the same full frame period may be controlled based on the recognition result that has been output from the recognition unit.

Additionally, although, in the above-described embodiment, the length of the accumulation period of the frame (i_1) is fixed, the length of the accumulation period of the frame (i_1) may be changed based on the determination result and the set value in the frame i−1.

Additionally, in the above-described embodiment, the length of each accumulation period and the number of times of accumulation in the full frame i+1 are controlled in a state in which the determination result and the setting value in the full frame i are held. However, the determination result and the setting value may be temporarily reset when the accumulation for the full frame i is completed, and the accumulation for the full frame i+1 may start in a state in which the initial setting value is set.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device and the like through a network or various storage media. Then, a computer (or a CPU, an MPU, or the like) of the photoelectric conversion device and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-103647, filed on Jun. 23, 2023, which is hereby incorporated by reference herein in its entirety.

What is claimed is:

1. A photoelectric conversion device comprising:
a plurality of pixels each of which is configured to include
   a sensor unit that generates pulses corresponding to photons, a counter that counts the number of the pulses, and a memory that stores a count value of the counter; and
at least one processor or circuit configured to function as:
a control unit configured to:
   generate signals based on count values of the counter counted within plural first accumulation periods and within a second accumulation period,
   perform accumulation operations in the plural first accumulation periods and the second accumulation period within a full frame period, wherein each of the first accumulation periods is shorter than the second accumulation period,
   for each of the plural first accumulation periods, output a signal generated in the respective first accumulation period between an end of the first accumulation period and an end of the second accumulation period, and
   control the number of times of first accumulation periods subsequent to one of the plural first accumulation periods and a duration of the first accumulation periods subsequent to the one of the plural first accumulation periods within the full frame period based on a result of evaluating signals generated based on the signal generated in the one of the plural first accumulation periods.

2. The photoelectric conversion device according to claim 1, wherein each of the plural first accumulation periods overlaps with the second accumulation period.

3. The photoelectric conversion device according to claim 1, wherein the one of the plural first accumulation periods and the second accumulation period start at the same time.

4. The photoelectric conversion device according to claim 1, wherein an end time of the second accumulation period coincides with an end time of the full frame period.

5. The photoelectric conversion device according to claim 1, wherein the at least one processor or circuit is further configured to function as a recognition unit configured to recognize an object based on a signal generated in at least the one of the plural first accumulation periods.

6. The photoelectric conversion device according to claim 5, wherein the evaluation signals are based on a recognition result output from the recognition unit.

7. The photoelectric conversion device according to claim 5, wherein the recognition unit is further configured to recognize the object based on a signal generated in the second accumulation period.

8. The photoelectric conversion device according to claim 1, wherein the at least one processor or circuit is further configured to function as a display unit configured to display a signal generated in at least the second accumulation period as an image.

9. The photoelectric conversion device according to claim 1, wherein the sensor unit includes an avalanche photodiode.

10. The photoelectric conversion device according to claim 1, wherein an average value of the signals generated in the one of the plural first accumulation periods is used as the evaluation signals.

11. The photoelectric conversion device according to claim 1, wherein the number of increases per unit time of a minimum value or a maximum value among the signals generated in the one of the plural first accumulation periods is used as the evaluation signals.

12. The photoelectric conversion device according to claim 1, wherein a histogram of the signals generated in the one of the plural first accumulation periods is used as the evaluation signals.

13. A movable apparatus comprising:
the photoelectric conversion device according to claim 1,
   wherein the at least one processor or circuit is further configured to function as a movable control unit configured to control an operation of the movable apparatus based on a result of recognition processing using the signals generated in at least the one of the plural first accumulation periods.

14. A photoelectric conversion method in which photoelectric conversion is performed by a plurality of pixels each of which is configured to include a sensor unit that generates pulses corresponding to photons, a counter that counts the number of the pulses, and a memory that stores a count value of the counter, the photoelectric conversion method comprising:
generating signals based on count values of the counter counted within plural first accumulation periods and within a second accumulation period;
performing accumulation operations in the plural first accumulation periods and the second accumulation period within a full frame period, wherein each of the first accumulation periods is shorter than the second accumulation period;
for each of the plural first accumulation periods, outputting a signal generated in the respective first accumulation period between an end of the first accumulation period and an end of the second accumulation period; and
controlling of the number of times of first accumulation periods subsequent to one of the plural first accumulation periods and a duration of the first accumulation periods subsequent to the one of the first accumulation periods within the full frame period based on a result of evaluating signals generated based on the signals generated in the one of the plural first accumulation periods.

15

16

15. A non-transitory computer-readable storage medium configured to store a computer program to cause a photoelectric conversion device according to any of claims 1 to 13 to perform the photoelectric conversion method according to claim 14.

\* \* \* \* \*